Feb. 15, 1966  A. R. RANGABE  3,235,267
SUSPENSION FOR THE PICK-UP HEAD OF A
GRAMOPHONE RECORD REPRODUCER
Filed May 22, 1963
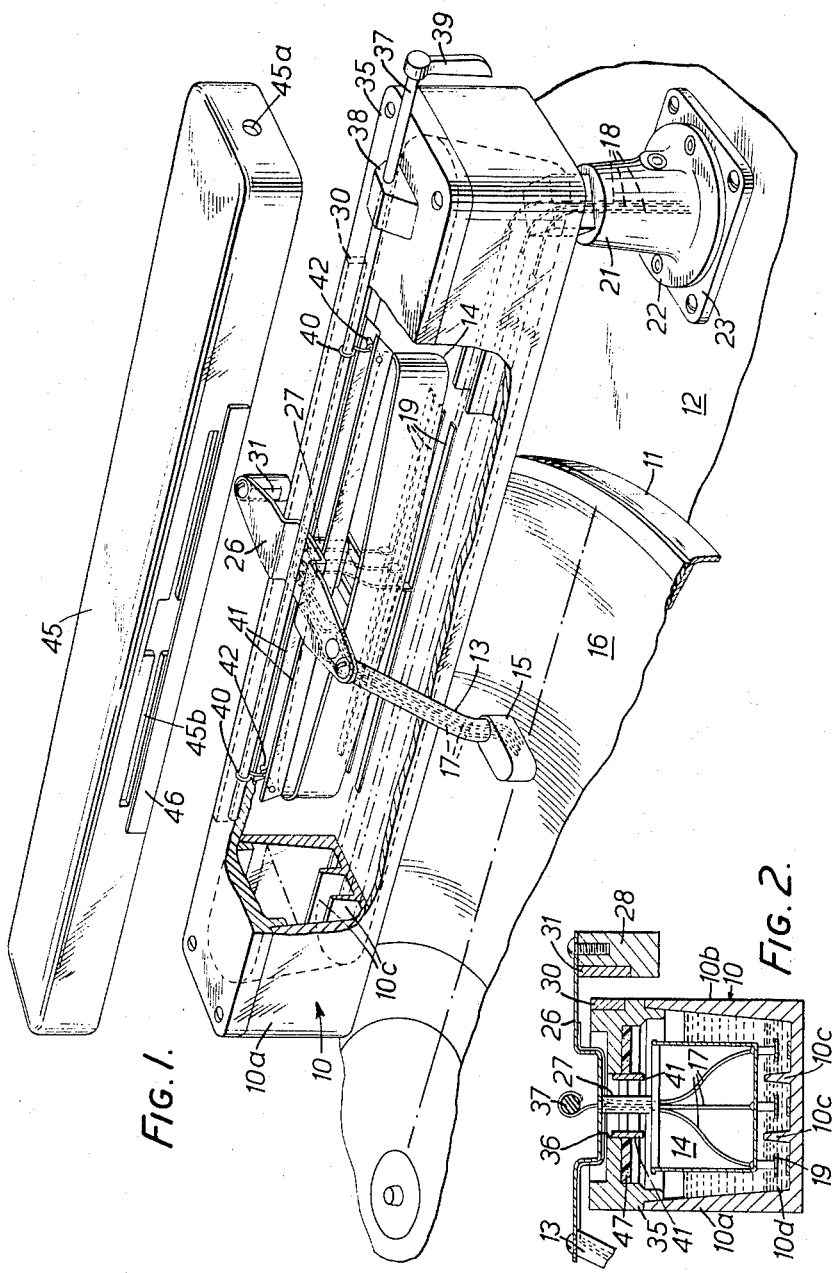
INVENTOR
ALEXANDER RIZO RANGABE
BY
Mason, Mason & Albright
ATTORNEYS United States Patent Office 3,235,267
Patented Feb. 15, 1966

3,235,267
SUSPENSION FOR THE PICK-UP HEAD OF A GRAMOPHONE RECORD REPRODUCER
Alexander R. Rangabe, Stoneacre, Denmead, Portsmouth, England
Filed May 22, 1963, Ser. No. 282,316
Claims priority, application Great Britain, May 23, 1962, 19,780/62
14 Claims. (Cl. 274—23)

This invention relates to an improved suspension for the transcription or pick-up head of a gramophone or phonograph record reproducer, which will be referred to hereinafter as a pick-up suspension.

It is conventional practice in such record reproducers, to support the transcription or pick-up head on the outer end of a pick-up arm which is pivotally mounted on the transcription or turntable deck. In this way, the head will move along an arcuate path about the pivot bearing of the arm as the record disc rotates.

The friction in the pivot bearing and the resultant of the forces acting on the head due to the head-offset and friction between the pick-up stylus and the record disc, combined with the stiffness of the conducting leads from the pick-up head to the deck, produce forces acting on the stylus in the radial direction which seriously interfere with high fidelity, in particular stereophonic, reproduction using modern high-compliance heads.

Although such a swinging arm is convenient, these difficuties make it preferable to use an arm which is supported for precisely radial movement. An arm supported in this latter way on a roller or sliding support has been proposed, but involves formidable problems of levelling and track accuracy, and again the electrical connections between the head and the amplifying circuit tends to interfere with the movement of the head to some degree.

The present invention comprises a pick-up suspension comprising a trough of liquid, a float movable along a rectilinear path in said trough and a pick-up arm supported on said float.

The present invention further comprises a pick-up suspension comprising an elongated trough for mounting on a transcription deck with its longitudinal axis parallel to a radius of the transcription turntable, a float located in liquid in said trough and movable parallel to said axis a pick-up arm supported on said float, and means for opposing movement of the float laterally of said axis in response to friction between the pick-up and a rotating record disc.

Again the present invention comprises a pick-up suspension comprising a liquid-containing elongated trough for mounting on a transcription deck with its longitudinal axis parallel spaced from a radius of the transcription turntable, a float movable in the liquid in said trough in a direction parallel to said radius, a pick-up arm supported on the float so that as the float moves along said direction, the stylus of the pick-up moves along a rectilinear path closely adjacent said radius, an elongate first magnet mounted on said trough and extending in a direction parallel to the direction of movement of the float, and a second magnet acting in opposition to the first magnet and mounted on a support connected to the float, the second magnet being disposed on the opposite side of the trough from the pick-up stylus.

One embodiment of the invention will now be particularly described, by way of example only, with reference to the accompanying drawings in which:

FIG. 1 is a perspective view of a pick-up suspension, and

FIG. 2 is a transverse section through the suspension of FIG. 1 taken on a vertical plane through the pick-up arm.

Briefly stated, the illustrated embodiment comprises an elongated trough 10 of liquid mounted above the turntable 11 of a transcription or turntable deck 12, and a pick-up arm 13 supported by a float 14 suspended in said liquid for movement along the trough as the pick-up head 15 moves radially inwardly over the recording track of a record disc 16.

In order to oppose the tendency of the float to move laterally as a result of frictional forces set up between the record disc and the stylus of the pick-up head, magnetic repulsion means are provided, being supported by the float and the trough. Again, in order to provide substantially frictionless and torsionless electrical connections between the electrical leads 17 from the pick-up head and the stationary electrical leads 18 on the deck, these connections are effected through electrodes 19 supported by the float which dip into liquid conductors supported by the trough.

We will now consider these features and other features of the illustrated embodiment in greater detail.

The trough 10 is substantially rectangular in vertical and horizontal section and is supported on the deck by means of a column 21 connected below the trough at one end. At the bottom of the column is a foot 22 which is screwed to a base plate 23, the base plate in turn being screwed to the deck. The connections between the trough 10 and the column 21, and between the foot 22 and the base plate 23 are preferably such as will permit adjustment of the trough to ensure that it is accurately level and that its longitudinal axis is accurately parallel to the radius of the disc traversed by the pick-up stylus.

The pick-up arm 13 is connected to the float 14 by means of a bridge member 26 which is supported above the float by an upstanding connecting stem 27 so that the bridge member extends both forwardly and rearwardly above the trough. The pick-up arm extends forwardly and downwardly from the forward end of the bridge member, and below the rearward end of the bridge member is a weight 28 for counterbalancing the weight of the arm and head.

The float 14, bridge member 26, stem 27, pick-up arm 13, head 14, and weight 28 form a floating system which can pivot about a vertical axis through the stem 27.

The force in the radial direction which acts on the head will be of the order of 300 dynes whereas the resistance to radial movement of the float in the liquid can be maintained at a value less than 1 dyne. Accordingly the result of these forces will result in a rotation of the float around the pivotal axis through an angle as little as 15 minutes of arc or less, which is quite acceptable.

In the event of eccentricity of the record track, the system will oscillate about this single pivotal axis and the moment of inertia of the system is thus kept to a minimum.

It will be appreciated that friction between the pick-up stylus and the record disc will tend to move the head forwards and push the float into contact with the front wall 10a of the trough. This must obviously be prevented since rubbing would then take place between the float and the wall which would set up undesirable frictional forces.

To overcome this difficulty, the float is stabilised to prevent any substantial forward movement, by means of the interaction between a strip magnet 30 extending along the rear wall 10b of the trough and a bar magnet 31 mounted on the weight 28. Both magnets are preferably made of a permanent magnetic ceramic material such as a barium ferrite. The strip magnet 30 extends a distance along the trough at least equal the radial extent of a record track and has along its forward side a north pole and along the rear side a south pole. The permanent magnet of the floating system has a south pole on the side thereof disposed opposite the south pole of the trough magnet so that mutual repulsion between the magnets occurs. When therefore the arm tends to move forwardly as a result of friction between the stylus and the record, or for any other reason, the mutual repulsion between the like magnetic poles will tend to draw the arm back. Although the magnets are preferably permanent magnets, it will be evident that an electromagent can be used in place of the strip permanent magnet.

Although the system described above employs the repulsive properties of two magnets located one behind the other, it is equally possible to employ the attractive properties of two magnets located one above the other.

As an alternative to the use of magnets, a roller can be mounted in jewelled bearings on the float to contact the front wall of the trough and thereby space the float from this wall. However the friction involved by this roller bearing, although small, makes it less satisfactory than the use of magnets as described above.

As a further alternative, one may employ the electrostatic attractive or repulsive properties of two charged surfaces.

The liquid used in the trough for supporting the float must be a liquid having a low vapour pressure, to minimise evaporation, and also one having a low viscosity. The liquid found most suitable for this purpose is an ester of sebacic or adipic acid such as di-2-ethyl hexyl sebacate, or alternatively a di-methyl silicone fluid.

In order to conduct the signal from the pick-up head to the amplifier, the base of the trough is divided by two ridges 10c into three parallel sub-troughs or channels 10d extending along the length of the main trough. Each of the sub-troughs contains an electrolyte, such for example as a saturated KCl solution which forms a liquid conductor, and the conducting strips or electrodes 19, which are insulated from the trough, lie in the base of the sub-troughs and are connected to the leads 18. It will be evident that the electrolyte must have a density greater than that of the liquid used for supporting the float, so that the electrolyte is maintained in the sub-troughs, and furthermore the float-supporting liquid must be an electrical insulator to prevent short-circuiting the electrolyte in the different sub-troughs. Preferably the electrolyte is a liquid insoluble in the float-supporting liquid, having a low vapour pressure and capable of dissolving suitable salts. A suitable electrolyte is a dihydric alcohol such as ethylene glycol with potassium chloride or potassium iodide dissolved in it. The electrodes preferably consist of silver strip which is not corroded by this electrolyte.

From the pick-up head, the three conducting leads 17 extend along the arm and along part of the bridge member 26 to the float 14, and terminate in the three elongated electrodes 19 which extend parallel to one another along the base of the float, each dipping into the electrolyte in a separate one of the three sub-troughs. It will be appreciated that three conducting leads are used in case of stereo sound reproduction, but if the apparatus is intended for mono reproduction, only two conducting leads and electrodes are necessary.

In order to provide for manual movement of the pick-up head over the record, a roof 35 is provided for the trough having a slot 36 therein whose length corresponds with the radial distance on the record covered by the recording track, this being normally about 4 inches. The stem 27 which connects the float to the bridge member passes upwardly through this slot.

Extending longitudinally of the trough above the roof is a rod 37 which is journalled in lugs 38, only one of which is shown, projecting upwardly from the upper side of the roof. The rod projects beyond the supported end of the trough and terminates in a knob 39 for rotating the rod. Two nylon threads 40 are secured to the rod at positions spaced apart therealong and the lower ends of the threads support a pair of parallel-spaced bars 41 which are rigidly interconnected by pins 42 and are thus suspended closely above the float, the stem 27 lying between the bars but spaced from both. The threads are in fact secured at their lower ends to the centre of the pins 42. Thus upon rotation of the rod, the threads are wound on to the rod, the bars are raised to engage and lift the bridge member 26 and thereby lift the float at least partially out of the liquid. It can then be moved manually, the bridge member sliding along the bars.

Any suitable catch, for example a spring-loaded detent, can be fitted to the end of the trough to lock the knob in the raised position of the float.

Since it is desirable to seal the trough when the pick-up is not in use, a sheet 47 of rubber is located on the under side of the roof around the slot. Thus on further rotation of the knob to raise the float further, the top of the float engages the rubber and the slot in the cover is thereby sealed, allowing the apparatus to be moved without fear of spilling the liquids.

In order to keep dust out of the apparatus, a cover 45 is provided to fit on to the roof of the trough, the cover having a hole 45a at one end through which the rod extends and a slot 45b along its front and rear sides to allow for the movement of the bridge member. Each slot is extended upwardly at its centre to permit the float to be fully raised. At this central position, the slot is also cut downwardly to the edge of the cover to permit insertion and removal of the bridge member upon fitting and removal of the cover. The downwardly-cut part of the slot however is covered on the front side of the cover by a readily detachable strip 46 which is calibrated to enable the user to select the desired position on the record disc on to which the pick-up head is to be lowered.

It will be evident that the principle of a float suspended in a liquid can also be used in association with cooperating magnets on the floats and on the liquid container respectively in a pick-up suspension in which the arm swings about a centre instead of moving parallel to a radius of the gramophone turntable.

Similarly, in this swinging type of pick-up suspension, electrodes supported on the float can move in electrolytes contained in channels which are arcuate about the centre of rotation of the arm.

I claim:

1. A pick-up suspension comprising a trough, liquid in said trough, a float lying in said liquid, mutually-repelling magnetic means on said float and on said trough preventing the float from touching said trough, a pick-up arm and means supporting said pick-up arm on said float.

2. A pick-up suspension comprising an elongated liquid-containing trough for mounting on a transcription deck with its longitudinal axis parallel to a radius of the transcription turntable, a float located in the liquid in said trough and movable parallel to said axis, a pick-up arm, means supporting said pick-up on said float, and means for opposing movement of the float laterally of said axis in response to friction between the pick-up and a rotating record disc comprising a first magnet connected to and movable with said float, and a second magnet mounted on said trough, said magnets acting in mutual opposition.

3. A pick-up suspension comprising a liquid-containing elongated trough for mounting on a transcription deck with its longitudinal axis parallel spaced from a radius of the transcription turntable, a float movable in the liquid in said trough in a direction parallel to said radius, a pick-up arm, means mounting said pick-up arm on the float so that as the float moves along said direction, the stylus of the pick-up moves along a rectilinear path closely adjacent said radius, an elongate first magnet on said trough extending in a direction parallel to the direction of movement of the float, a support connected to the float on the opposite side of the trough from the pick-up stylus, and a second magnet on said support, said second magnet repelling said first magnet.

4. A pick-up suspension comprising a trough, a floatant liquid in said trough, a float lying in said liquid for movement along said trough, a pick-up arm, a pick-up head on said arm, means supporting said pick-up arm on said float, a plurality of channels, each channel extending along a direction parallel to the direction of movement of the float, a liquid conductor contained in each channel, a corresponding plurality of electrodes on said float each dipping into the liquid conductor of a separate one of said channels, and a corresponding plurality of first conducting leads each extending along said pick-up arm to a separate one of said electrodes, and in combination therewith, amplifier means, and a plurality of second conducting leads connecting said amplifier means to the liquid conductors so that electric signals generated at the pick-up are transferred via the first conducting leads, the electrodes, the liquid conductors and the second conducting leads to the amplifier means.

5. A pick-up suspension comprising a trough, a floatant liquid in said trough, a float lying in said liquid for movement along said trough, a pick-up arm, a pick-up head on said arm, means supporting said pick-up arm on said float, a plurality of channels formed along the base of the trough, a liquid conductor contained in each channel, said liquid conductor having a specific gravity greater than that of the said floatant liquid in the trough, a corresponding plurality of electrodes on said float each dipping into a separate one of said channels so that the electrodes move along said channels as the float moves along the trough, and a plurality of first conducting leads each extending along said pick-up arm from said head to a separate one of said electrodes, and in combination therewith, amplifier means, and a plurality of second conducting leads connecting said amplifier means to the liquid conductors so that electric signals generated at the pick-up are transferred via the first conducting leads, the electrodes, the liquid conductors and the second conducting leads to the amplifier means.

6. A suspension according to claim 5 wherein said floatant liquid in the trough is selected from the group which comprises an ester of sebacic acid, an ester of adipic acid and silicone fluids, and said liquid conductor is selected from the group which comprises dihydric alcohols with potassium chloride dissolved therein, and dihydric alcohols with potassium iodide dissolved therein.

7. A suspension according to claim 5 wherein a conducting metal strip extends along each channel.

8. A pick-up suspension comprising a trough, a floatant liquid in said trough, a float lying in said liquid for movement along said trough, a pick-up arm, a pick-up head on said arm, means supporting said pick-up arm on said float, a roof on said trough, said roof having a slot therealong through which extends a support connected at one end to the float and at its opposite end to said pick-up arm, the width and length of the float relative to the dimensions of the slot being such that lifting of the float in any position thereof is effective to seal said slot, and further comprising means for lifting said float.

9. A suspension according to claim 8 wherein said means for lifting the float comprise a rod extending parallel to said slot thereabove, a plurality of threads connected between said rod and said float, and a handle for rotating said rod to wind the threads thereon and thereby lift the float.

10. A suspension according to claim 8 comprising sealing means on the under surface of said roof for effecting sealing between said roof and said float when raised.

11. A gramophone pick-up suspension comprising a float located in a liquid, a pick-up arm on said float, a plurality of first conducting leads extending along said arm, a corresponding plurality of electrodes on said float, each electrode connected to one of said leads, and a plurality of separate liquid conductor containers, each electrode dipping into a said container, and in combination therewith, amplifier means, and a plurality of second conducting leads connecting said amplifier means to the liquid conductors so that electric signals generated at the pick-up are transferred via the first conducting leads, the electrodes, the liquid conductors and the second conducting leads to the amplifier means.

12. A pick-up suspension comprising a pick-up arm, a pick-up head thereon, a stationary support, means mounting said arm for movement relative to said support, a plurality of liquid-conductor-containing channel means on said support, a corresponding plurality of electrodes dipping into said channel means, means mounting said electrodes for movement with said arm and first conducting leads interconnecting said electrodes and said pick-up head, and in combination therewith, amplifier means, and a plurality of second conducting leads connecting said amplifier means to the liquid conductors so that electric signals generated at the pick-up are transferred via the first conducting leads, the electrodes, the liquid conductors and the second conducting leads to the amplifier means.

13. A pick-up suspension comprising a pick-up arm, a pick-up head thereon, a stationary liquid container, a float supported in liquid in said container, means mounting said arm on said float and magnetic means of like polarity on said float and on said container for opposing displacement on said float due to longitudinal movement of said arm.

14. In a record-player having a pick-up and an amplifier, a pick-up suspension comprising a trough, a floatant liquid in said trough, a float in said liquid, a pick-up arm on said float, means defining a plurality of separate liquid-containing channels in said troughs, a liquid conductor in each said channel, a corresponding plurality of electrodes on said float each dipping into the liquid conductor in a separate one of said channels, a first plurality of conducting leads each connecting a separate one of said electrodes with said pick-up and a second plurality of conducting leads each connecting a separate one of said liquid conductors with said amplifier so that electric signals generated at the pick-up are transferred to the amplifier via the first conducting leads, the liquid conductors and the second conducting leads.

References Cited by the Examiner
UNITED STATES PATENTS
3,101,952   8/1963   Godfrey et al. _____ 274—23

NORTON ANSHER, *Primary Examiner.*